US009548581B2

(12) United States Patent
Nicholas et al.

(10) Patent No.: US 9,548,581 B2
(45) Date of Patent: Jan. 17, 2017

(54) TERMINAL CRIMPING MACHINE WITH A TERMINAL FEED ALIGNMENT AID

(71) Applicant: Tyco Electronics Corporation, Berwyn, PA (US)

(72) Inventors: Keith Lynn Nicholas, Harrisburg, PA (US); Jay Alan Snyder, Palmyra, PA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 552 days.

(21) Appl. No.: 13/888,995

(22) Filed: May 7, 2013

(65) Prior Publication Data

US 2014/0331495 A1 Nov. 13, 2014

(51) Int. Cl.

| | |
|---|---|
| ***B23P 21/00*** | (2006.01) |
| ***B23Q 15/00*** | (2006.01) |
| ***H01R 43/058*** | (2006.01) |
| ***H01R 43/048*** | (2006.01) |
| ***H01R 43/055*** | (2006.01) |

(52) U.S. Cl.

CPC .......... *H01R 43/058* (2013.01); *H01R 43/048* (2013.01); *H01R 43/055* (2013.01); *Y10T 29/49185* (2015.01); *Y10T 29/53235* (2015.01)

(58) Field of Classification Search

CPC ...... G01N 29/04; G01N 29/07; G01N 29/221; G01N 29/265; H01R 43/048; H01R 43/0486; H01R 43/0488; H01R 43/058; H01R 43/0207; Y10T 29/53022; Y10T 29/53196; Y10T 29/53235; Y10T 29/5327

USPC ...................................... 29/705, 753; 73/588

See application file for complete search history.

(56) References Cited

U.S. PATENT DOCUMENTS

| | | | | |
|---|---|---|---|---|
| 4,685,787 | A * | 8/1987 | Kinnard | G03B 35/10 396/32 |
| 4,979,291 | A * | 12/1990 | Phillips et al. | 29/863 |
| 5,174,022 | A * | 12/1992 | Phillips et al. | 29/863 |
| 5,745,982 | A * | 5/1998 | Klinedinst | 29/753 |
| 7,870,667 | B2 * | 1/2011 | Takada | 29/861 |
| 8,316,539 | B2 * | 11/2012 | Chikyu | 29/863 |
| 8,336,198 | B2 * | 12/2012 | Tien | 29/751 |
| 2007/0000124 | A1 * | 1/2007 | Shandersky et al. | 29/748 |
| 2007/0129822 | A1 * | 6/2007 | Nicholas | 700/32 |
| 2014/0173887 | A1 * | 6/2014 | Yost et al. | 29/593 |

FOREIGN PATENT DOCUMENTS

| | | |
|---|---|---|
| JP | 2005 216717 A | 8/2005 |
| JP | 2008 177031 A | 7/2008 |
| WO | 2011/117604 A1 | 9/2011 |
| WO | 2012/014674 A1 | 2/2012 |
| WO | 2014/023879 A1 | 2/2014 |

* cited by examiner

*Primary Examiner* — Paul D Kim

(57) ABSTRACT

A terminal crimping machine includes an applicator having a movable ram and an anvil. The anvil is located in a crimping zone and configured to receive a terminal thereon. The ram has crimp tooling that is configured to crimp the terminal on the anvil to a wire during a crimp stroke of the ram. An image acquisition device is positioned to acquire at least one image of the crimping zone. A display device is configured to display the at least one acquired image.

20 Claims, 11 Drawing Sheets

TERMINAL CRIMPING MACHINE WITH A TERMINAL FEED ALIGNMENT AID

BACKGROUND OF THE INVENTION

The subject matter herein relates generally to terminal feed alignment aids for terminal crimping machines.

Electrical terminals are typically crimped onto wires by a crimping machine to form a lead. In operation, a terminal is placed in a crimp zone, and an end of a wire is inserted into the ferrule or barrel of the terminal. A ram is caused to move toward the base through a crimp stroke, thereby crimping the terminal onto the wire. The terminals, prior to crimping, are typically provided in strip form. The strip of terminals must be manually loaded into the crimping machine by an operator. The position of the terminal strip within the crimp zone is critical to the overall performance. A terminal that is not properly located in either the side-to-side or front-to-back directions will not meet the crimp specification after it is crimped to a wire. Leads that do not meet crimp specifications are discarded.

There are several mechanical adjustments within the crimping machine to position the terminal within the crimp zone relative to the mechanical crimp tooling. It is up to the skill of the operator to properly make those adjustments. One area of difficulty is adjusting the side-to-side feed position, which is especially difficult with physically small terminals. The operator must exercise great care, exceptional vision, and finesse to adjust the crimping machine so that the terminal is properly centered relative to the mechanical tooling. In addition to requiring skill and diligence, these small manual adjustments take time and reduce production efficiency. Costs are increased due to reduced efficiency and discarded misaligned leads. There is a lack of gages or setup tools to help the operator with this task.

A need remains for a crimping machine that supports proper alignment of the terminal relative to the mechanical crimp tooling.

BRIEF DESCRIPTION OF THE INVENTION

In one embodiment, a terminal crimping machine is provided that includes an applicator having a movable ram and an anvil. The anvil is located in a crimping zone and configured to receive a terminal thereon. The ram has crimp tooling that is configured to crimp the terminal on the anvil to a wire during a crimp stroke of the ram. An image acquisition device is positioned to acquire at least one image of the crimping zone. A display device is configured to display the at least one acquired image.

Optionally, the terminal crimping machine may include an alignment module that is configured to superimpose an alignment line of the anvil and an alignment line of the terminal on one displayed image. The terminal may be aligned with the anvil by adjusting the position of the terminal to align the alignment line of the terminal with the alignment line of the anvil.

In another embodiment, a method of aligning a terminal within a terminal crimping machine is provided. The terminal crimping machine includes an applicator that has a movable ram and an anvil. The anvil is located in a crimping zone and configured to receive the terminal thereon. The ram has crimp tooling that is configured to crimp the terminal on the anvil to a wire during a crimp stroke of the ram. The method includes positioning an image acquisition device to acquire at least one image of the crimping zone. The at least one image includes at least one of the terminal and the anvil. The method also includes displaying the at least one acquired image on a display device. The method additionally includes superimposing an alignment line of the anvil and an alignment line of the terminal on one displayed image. The method further includes aligning the terminal with the anvil by adjusting the position of the terminal to align the alignment line of the terminal with the alignment line of the anvil.

DETAILED DESCRIPTION OF THE INVENTION

Figure 1:
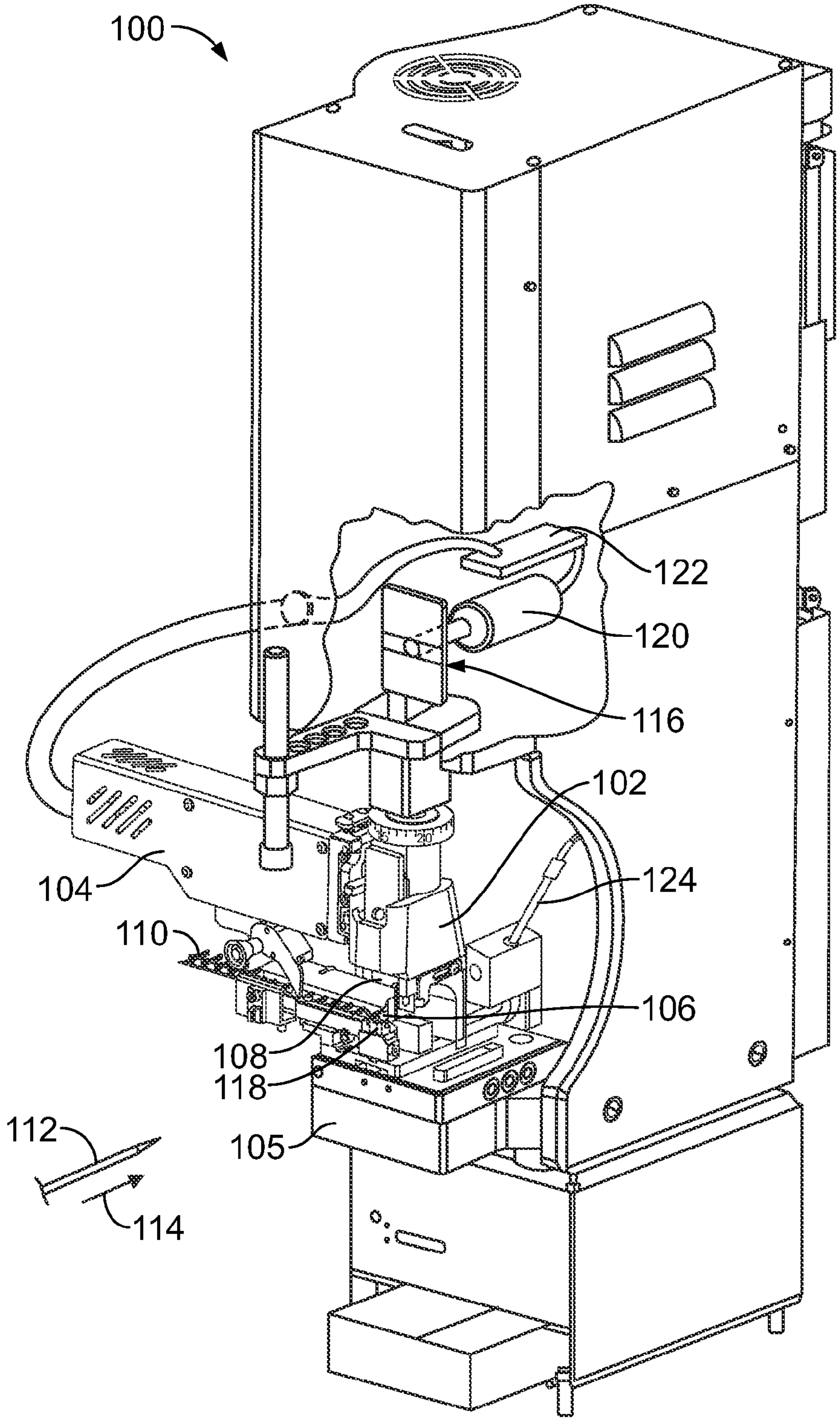
FIG. 1 is a perspective view of a terminal crimping machine according to an exemplary embodiment.

FIG. 1 is a perspective view of a crimping machine 100 having an applicator 102 and a feeder device 104. The crimping machine 100 is illustrated as a terminal crimping machine used for crimping connectors to wires, however, other types of machines may be used, such as an insulation displacement connector (IDC) machine, a welding machine, and the like, that attach connectors to wires using processes other than crimping. Alternatively, the crimping machine 100 may be another type of crimping machine such as a lead frame machine.

The applicator 102 is coupled to a support 105 of the crimping machine 100. The applicator 102 may be removed and replaced with a different applicator, such as when the applicator 102 is worn or damaged or when an applicator having a different configuration is desired. The applicator 102 has a terminating zone or crimping zone 106 and includes a crimper or crimp tooling 108 and an anvil 118 as the mechanical tooling for crimping electrical connectors or terminals 110 to an end of a wire 112 in the crimping zone 106. The anvil 118 is a stationary component of the applicator 102, and the crimp tooling 108 represents a movable component.

An image acquisition device 124 is mounted to the crimping machine 100. The image acquisition device 124 may be an electronic microscope, borescope, digital camera, video camera, or the like. The image acquisition device 124 may be mounted to the support 105 of the crimping machine 100, to the applicator 102, or to another structure in the vicinity of the crimping zone 106. In an exemplary embodiment, the image acquisition device 124 is positioned to have a field of view that includes the crimping zone 106. The image acquisition device 124 may acquire images and/or video of the crimping zone 106, and transmit image/video data representative of the images/video to a storage device or a display device, either on the crimping machine 100 or at an external location from the crimping machine 100. The image acquisition device 124 may additionally have a macro capability, so the images and/or video acquired are magnified when displayed. Therefore, the operator or user of the crimping machine 100 may be able to align small terminals 110 in the crimping zone 106 more easily than by the naked eye. The terms "operator" and "user" are used interchangeably herein to identify the person operating or controlling the crimping machine 100. In an alternate embodiment, the crimping machine 100 may automatically adjust the position of the terminal 110 relative to the anvil 118 and/or crimp tooling 108, rather than having user or manual adjustment based on the images. In other alternate embodiments, the anvil 118 and/or crimp tooling 108 may be adjusted either manually or automatically based on the images.

The feeder device 104 is positioned to feed terminals 110 to the applicator 102 and present the terminals 110 to the crimping zone 106. Optionally, the feeder device 104 may be positioned adjacent to, or even coupled to, the applicator 102. Alternatively, the feeder device 104 may be positioned remote with respect to the applicator 102, but still delivers the terminals 110 to the crimping zone 106. The terminals 110 may be guided to the crimp zone 106 by a guide member (not shown). The wires 112 are delivered to the crimping zone 106 by a wire feeder (not shown) or a bench machine (not shown) in a wire loading direction 114.

The feeder device 104 may be configured to deliver, and the applicator 102 may be configured to receive, multiple different sizes of terminals 110 for crimping. The feeder device 104 may be configured to deliver either side-feed terminals or end-feed terminals. Side-feed terminals are arranged side-by-side on a carrier strip and end-feed terminals are arranged successively, end-to-end. The crimping machine 100 is configured to receive applicators for either type of terminal, namely the side-feed or the end-feed terminals. Thus a first type of applicator may be configured to receive side-feed terminals and a second type of applicator may be configured to receive end-feed terminals. The side-feed and end feed types of applicators may be interchanged within the crimping machine 100. The applicator 102 illustrated in FIG. 1 is a side-feed type applicator 102, and the terminals 110 are side-feed terminals 110.

During a crimping operation, the crimp tooling 108 is driven through a crimp stroke by a driving mechanism 116 of the crimping machine 100 initially towards the stationary anvil 118 and finally away from the anvil 118. Thus, the crimp stroke has both a downward component and an upward component. The crimping of the terminal 110 to the wire 112 occurs during the downward component of the crimp stroke. The crimp tooling 108 engages the terminal 110 and crimps the terminal 110 onto the wire 112 by compressing the terminal 110 between the crimp tooling 108 and the anvil 118. In an exemplary embodiment, the driving mechanism 116 is driven by a crimping machine actuator 120. Optionally, the crimping machine actuator 120 may be a motor having a drive shaft that moves the driving mechanism 116. Alternatively, the crimping machine actuator 120 may be a linear actuator, a piezoelectric actuator, a pneumatic actuator, and the like. The operation of the crimping machine actuator 120 is controlled by a control module 122.

Figure 2:
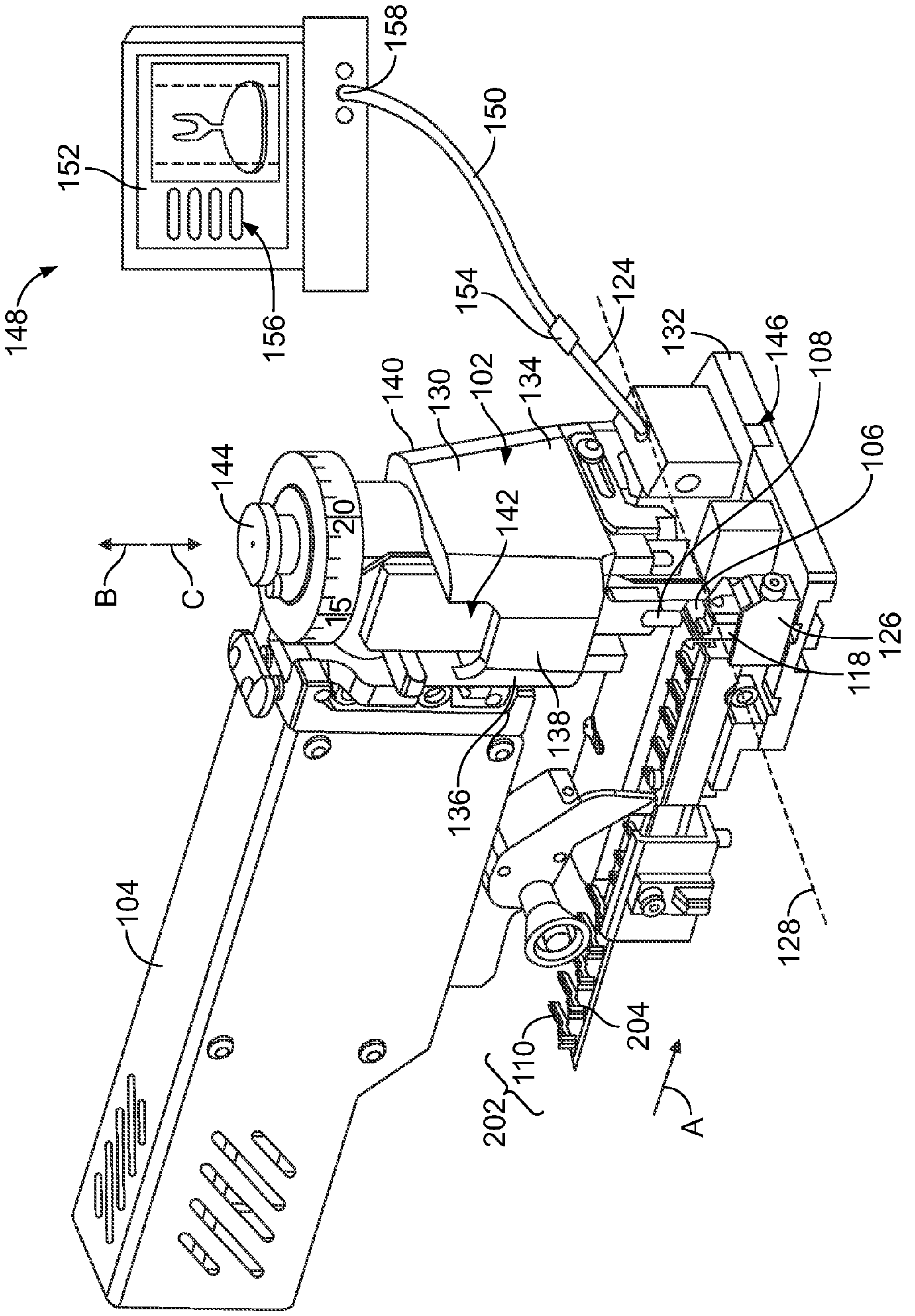
FIG. 2 is a perspective view of a side-feed type applicator and a feeder device according to an exemplary embodiment.

FIG. 2 is a perspective view of the side-feed type applicator 102 and the feeder device 104. The feeder device 104 is positioned adjacent to the applicator 102. The feeder device 104 repetitively feeds individual terminals 110 from a terminal strip 202 to the crimping zone 106 for crimping to the wire 112 (shown in FIG. 1). The applicator 102 includes a frame 130 having a base 132. The anvil 118 is coupled to the base 132 through a base plate 126. Optionally, the base plate 126 may be coupled to the base 132 in a manner that would permit vertical movement of the plate 126. For example, an adjustment mechanism, such as an adjusting screw, may be used to adjust a vertical position of the base plate 126.

The frame 130 includes a front 134, a rear 136, a left side 138, a right side 140, and a central cavity 142. The feeder device 104 may be positioned adjacent to the rear 136, and the terminals 110 are carried or advanced in a feed direction, shown by arrow A, from the rear 136 toward the front 134. Optionally, the terminals 110 may be presented along the left side 138. The sides 138 and 140 extend generally parallel to the feed direction A of the terminals 110. A ram 144 is received within the central cavity 142 and is movable with respect to the frame 130. The crimp tooling 108 is coupled to the ram 144 and is positioned adjacent to the left side 138. The crimp tooling 108 and the anvil 118 are removable from the ram 144 and the base plate 126, respectively, to allow substituting other types and/or sizes of crimp tooling and/or anvils. As such, many different types and sizes of terminals 110 and wires 112 (shown in FIG. 1) may be used with the crimping machine 100 (shown in FIG. 1).

The ram 144 is coupled to the driving mechanism 116 (shown in FIG. 1) of the crimping machine 100 (shown in FIG. 1). The driving mechanism 116 moves the ram 144 vertically in a lifting or reset direction, shown by arrow B, generally away from the anvil 118, and also in a crimping direction, shown by arrow C, generally toward the anvil 118. The feeding of the terminals 110 and the driving of the ram 144 are coordinated. For example, as the ram 144 is moved in the lifting direction B, the terminals 110 are advanced in the feed direction A by the feeder device 104 to a feed position (not shown) in the crimping zone 106. The feed position is the location and orientation of the terminal 110 in the crimping zone 106 relative to the anvil 118 and/or the crimp tooling 108 once the feeder device 104 ceases applying force to the terminal 110. Optionally, the terminals 110 may also be advanced while the ram 144 is moved in the crimping direction C. The terminal 110 in the crimping zone 106 is located at least partially on the anvil 118 and is stationary as the crimp tooling 108 nears the crimping zone 106.

The image acquisition device 124 is positioned to acquire images and/or video of the terminal 110 and/or the anvil 118 in the crimping zone 106. In an exemplary embodiment, the image acquisition device 124 is positioned in-line with a longitudinal axis 128 of the anvil 118. For example, the image acquisition device 124 may be placed proximate to the right side 140 on the opposite side of the anvil 118 from the wire feeder (not shown). By positioning the image acquisition device 124 in-line with the axis 128, the image acquisition device 124 is also in-line with an axis defined by the length of each terminal 110 placed in the crimping zone 106, as well as with an axis defined by the wire 112 (shown in FIG. 1) being fed to a barrel 204 of the terminal 110. The field of view captured by the image acquisition device 124 shows how the terminal 110 is aligned side-to-side relative to the anvil 118 and/or the wire 112, as well as how the terminal 110 is oriented angularly relative to the anvil 118 and/or the wire 112. Optionally, the image acquisition device 124 may be positioned in-line with the axis 128 on the other side of the anvil 118 proximate to the left side 138 of the applicator 102, as long as there is enough room for both the image acquisition device 124 and the wire feeder, which is located in the same area.

In an alternate embodiment, in-line placement with the longitudinal axis 128 may not be available due to space constraints of various applicator and/or crimping machine configurations. In such case, the image acquisition device 124 may be positioned out-of-line or off-center from the axis 128, but mirrors or other image guides, such as fiber optics, may be used to provide an in-line image angle. Optionally, off-center placement of the image acquisition device may be permissible without use of image guides, especially since magnification of the image would still provide a better view of terminal positioning that the operator's naked eye.

Figure 3:
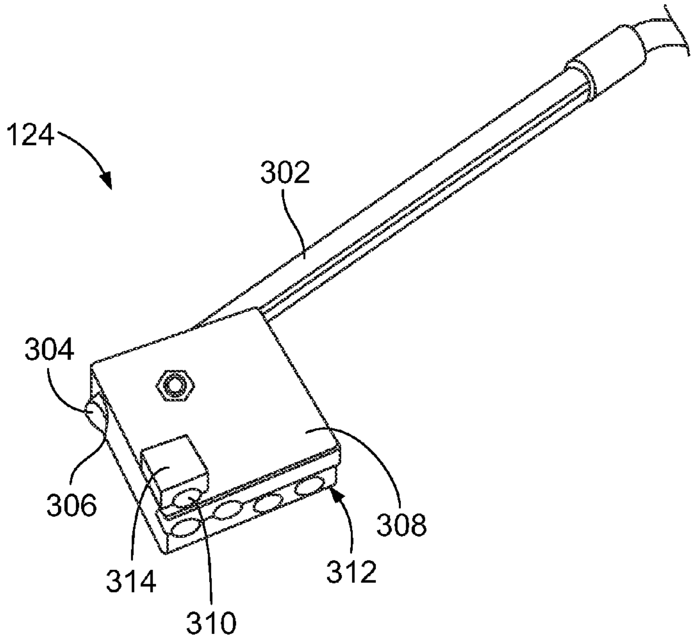
FIG. 3 is a perspective view of an image acquisition device according to an exemplary embodiment.

FIG. 3 is a perspective view of the image acquisition device 124 according to an exemplary embodiment. The image acquisition device 124 may include a rigid or flexible tube 302 with a lens 304 at a distal end 306. The lens 304 may be a magnifying glass configured to produce a magnified image. The distal end 306 may also include optical fibers or light emitting diodes (LEDs) (not shown) for illuminating the field of view of the lens 304.

The image acquisition device 124 includes a mounting fixture 308 that is removably mounted to the base 132 (shown in FIG. 2) of the applicator 102 (shown in FIG. 2) or to the support 105 (shown in FIG. 1) of the crimping machine 110 (shown in FIG. 1). For example, the mounting fixture 308 may be mounted magnetically using magnets 310 along a bottom side 312 of the mounting fixture 308. Alternatively, the mounting fixture 308 may be held in place by using mechanical fasteners, latches, adhesives, and the like. The mounting fixture 308 may be keyed to the base 132 or to the support 105 in a single orientation for repeatable alignment of the image acquisition device 124. For example, the mounting fixture 308 may include a keying feature 314 proximate to the bottom 312, and the base 132 may include a track 146 (shown in FIG. 2) that is configured to receive the mounting fixture 308 in only a single orientation relative to the base 132. Therefore, the field of view captured by the image acquisition device 124 in the acquired images remains constant during crimping operations. While the mounting fixture 308 is illustrated as a rectangular box-like structure, the mounting fixture 308 may have other shapes. The image acquisition device 124 may be provided without the use of a mounting fixture 308.

Referring back to FIG. 2, a display device 148 may be communicatively coupled to the image acquisition device 124 and configured to display images and/or video acquired by the image acquisition device 124. The display device 148 may be integrated into a host computer (not shown) of the crimping machine 100 (shown in FIG. 1) itself or may be a separate computer, such as a desktop computer, a laptop computer, a tablet computer, a monitor, a projector, and the like. Optionally, the display device 148 may be a crimp quality monitor (CQM) device (not shown). The display device 148 may be coupled to the image acquisition device 124 through a cable 150 that extends from a proximal end 154 of the tube 302 (shown in FIG. 3). The other end of the cable 150 may be configured as an input connector 158, such as a USB mating connector. The input connector 158 removably plugs into an input port of the display device 148. Alternatively, the display device 148 may communicate wirelessly through induction, radio frequency waves, Wi-Fi, and the like to transmit image data between the image acquisition device 124 and the display device 148.

The display device 148 includes a monitor 152 which displays images and/or video acquired by the image acquisition device 124. In an exemplary embodiment, the acquired images and/or video are magnified when displayed on the monitor 152 of the display device 148. The display device 148 optionally may be located on or proximate to the crimping machine 100 (shown in FIG. 1) so an operator may easily view the images on the monitor 152 while aligning the terminals 110 and operating the crimping machine 100. Thus, the image acquisition device 124 and display device 148 provide a terminal feed alignment aid to the operator of the crimping machine 100. The images and/or video displayed on the monitor 152 may be updated to show each terminal 110 in the crimping zone 106. In an exemplary embodiment, an updated image of one terminal 110 may be shown both before and after adjusting a position of the terminal 110 to provide magnified visual feedback of the adjustment. As described further below, the display device 148 may include a user interface 156 that allows a user or operator to navigate the display device 148.

Figure 4:
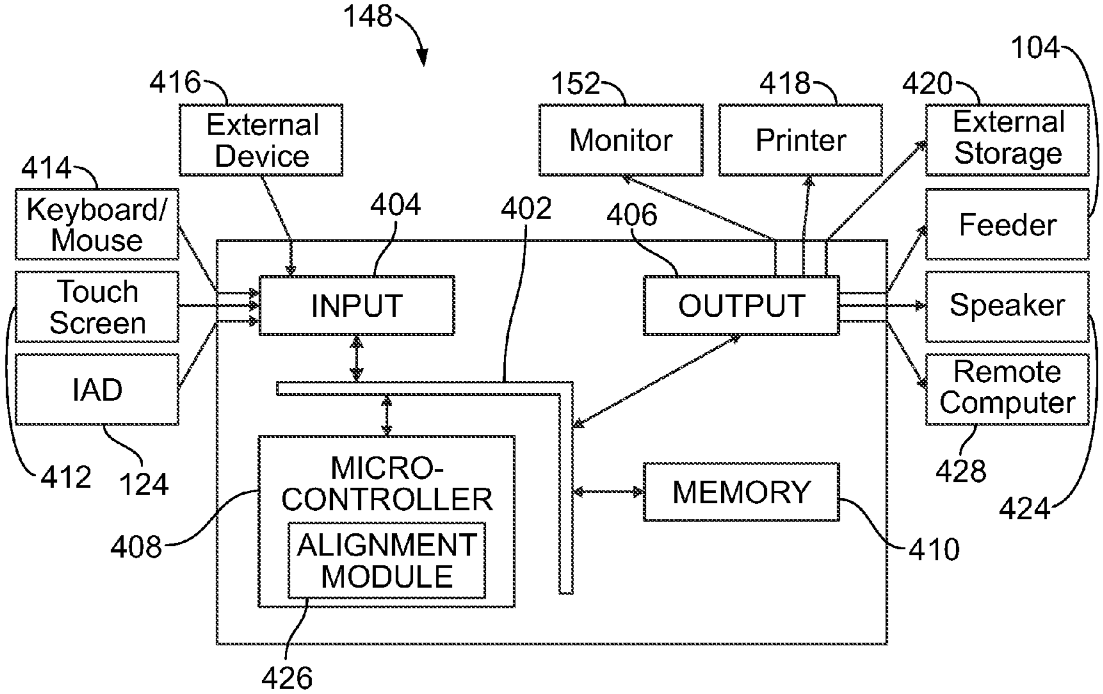
FIG. 4 is a functional block diagram of a display device according to one embodiment.

FIG. 4 is a functional block diagram of the display device 148 according to an exemplary embodiment. The components within the display device 148 may be implemented to perform the display processes above. The display device 148 includes an internal bus 402 that connects/interfaces with, for example, an input module 404, an output module 406, a microcontroller 408, and/or a memory 410. The internal bus 402 is an address/data bus that transfers information between the various components described herein. The input module 404 may be configured to receive information from various inputs, including, for example, the image acquisition device 124, a touch screen 412 on the monitor 152, a keyboard and/or mouse 414, and/or an external device 416, such as a smart phone, tablet, or remote computer. The image and/or video data acquired by the image acquisition device 124 is received by the display device 148 at the input module 404. The touch screen 412 accepts a user's touch input when selections are made on the user interface 156 (shown in FIG. 2) on the monitor 152. The input devices may be used, for example, to enter measured dimensions of the anvil 118 (shown in FIG. 2) and/or the terminal 110 (shown in FIG. 2) in order to calibrate the displayed images, as described further below.

The display device 148 includes a microcontroller 408 that is designed to control various operations and interfacing between the input module 404, output module 406, and memory 410. The microcontroller 408 may include a microprocessor (or equivalent control circuitry), RAM and/or ROM memory, logic and timing circuitry, state machine circuitry, and/or I/O circuitry for interfacing with the input and output modules 404, 406, respectively. The microcontroller 408 also includes an alignment module 426. The alignment module 426 is configured to aid the alignment of the terminals 110 fed to the crimping zone 106 to consistently produce quality crimped leads. The alignment module 426 may be implemented in hardware as part of the microcontroller 408, or as software/firmware instructions programmed into and executed by the microcontroller 408. Alternatively, the alignment module 426 may reside separately from the microcontroller 408 as a standalone component. As described further herein, the alignment module 426 is configured to superimpose one or more alignment lines of the anvil 118 (shown in FIG. 2) and one or more alignment lines of the terminal 110 (shown in FIG. 2) on a displayed image. By comparing the relative locations of the alignment lines, the operator of the display device 148 may determine how the position of the terminal 110 in the crimping zone 106 (shown in FIG. 2) should be adjusted relative to the anvil 118 to produce a quality crimped lead.

The memory 410 may include a hard disk drive, RAM, ROM, and/or another internal data storage device. The memory 410 may be configured to store image and/or video data acquired by the image acquisition device 124 (shown in FIG. 2). For example, still pictures of the displayed images may be saved in the memory 410 for subsequent quality reporting purposes. In addition, the memory 410 may store user input information, such as the locations of user-selected alignment lines of the anvil 118 and/or terminals 110 (both shown in FIG. 2), as discussed further herein. For example, once one or more alignment lines of the anvil 118 are determined, the location of the line(s) may be stored in the memory 410 as a constant since the anvil 118 is stationary relative to the image acquisition device 124. The location of the anvil 118 alignment line(s) may be recalled from the memory 410 by the microcontroller 408 before each crimp stroke in order to compare one or more alignment lines of the terminal 110 in the crimping zone 106 with the constant anvil 118 alignment line(s). In addition, the memory 410 may store measured dimensions for calibration purposes. Furthermore, the memory 410 may store additional information, such as the number of terminals 110 crimped during a crimping session.

The output module 406 may communicate information from the display device 148 to, for example, the monitor 152 (shown in FIG. 2), a printer 418, an external storage device 420 (e.g., flash disk, floppy disk, CD, DVD, external hard drive, server, etc.), the feeder device 104 (shown in FIG. 2), a speaker 424, and/or a remote computer 428. In an exemplary embodiment, the monitor 152 displays image and/or video data in addition to alignment lines of the anvil 118 and/or terminal 110 (both shown in FIG. 2). Once calibrated, the display device 148 may be configured to automatically send adjustment commands to the feeder device 104 (shown in FIG. 2). The adjustment commands order the feeder device 104 to modify the feed position of the terminals to better align the terminals 110 in the feed position with the anvil 118. The amount of modification may be based on a calibrated variable optionally stored in the memory 410. The output module 406 also may send data to the external storage device 420 and/or the remote computer 428 using wired or wireless direct connections or network connections (i.e. local area network or Internet).

FIGS. 5-10 display various screen shots displayed on the monitor 152 (shown in FIG. 2) of the display device 148 (shown in FIG. 2) according to an exemplary embodiment. The screen shots may be displayed sequentially according to a process for aligning terminals 110 (shown in FIG. 2) within the crimping zone (shown in FIG. 2) of the terminal crimping machine 100 (shown in FIG. 1).

Figure 5:
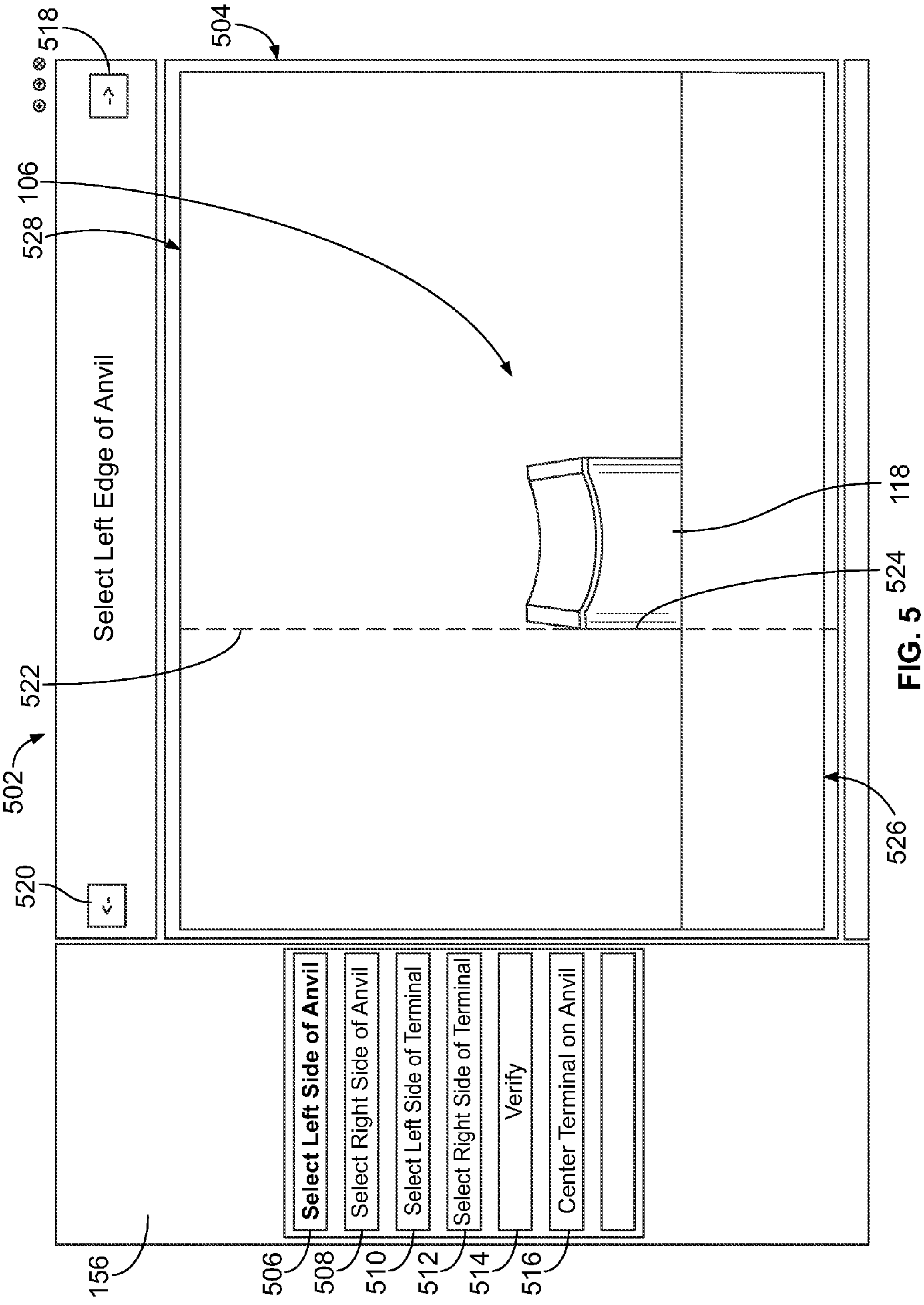
FIG. 5 shows a first screen shot displayed on a monitor of a display device.

FIG. 5 shows a screen shot 502 that includes an image 504 depicting the anvil 118 in the crimping zone 106 that was acquired by the image acquisition device 124 (shown in FIG. 2). In image 504, there is no terminal 110 (shown in FIG. 2) on the anvil 118 in the crimping zone 106. The display device 148 (shown in FIG. 2) optionally may also display the user interface 156 on the monitor 152 (shown in FIG. 2). The user interface 156 allows a user to interact with and navigate the display device 148, such as by including various buttons. For example, the user interface 156 may include a "Select Left Side of Anvil" button 506, a "Select Right Side of Anvil" button 508, a "Select Left Side of Terminal" button 510, a "Select Right Side of Terminal" button 512, a "Verify" button 514, and/or a "Center Terminal on Anvil" button 516. Optionally, the user interface 156 may include a right arrow button 518 to advance and a left arrow button 520 to go back.

In screen shot 502, the "Select Left Side of Anvil" button 506 is highlighted, and an alignment line 522 is displayed on the image 504. The alignment line 522 is a vertical line that is superimposed on the image 504 by the alignment module 426 (shown in FIG. 4), and extends from a bottom 526 of the image 504 to a top 528 of the image 504. The shown alignment line 522 is dashed, but the alignment line 522 optionally may be a solid line. In an alternative embodiment, the alignment line 522 may be a short line segment, a single bullet point, or the like, and not extend from the bottom 526 to top 528 of the image 504.

In an exemplary embodiment, alignment line 522 may be manipulated to line up with a left edge 524 of the anvil 118. The alignment line 522 may be manipulated by a user to select where the line 522 should be located on the image 504. For example, the user may use an input such as the keyboard/mouse 414, touch screen 412, or external device 416 of the display device 148 (all shown in FIG. 4). Optionally, the user interface 156 may allow the user to drag the line 522 into position or simply select the position where the line 522 should be located. The shown screen shot 502 shows the alignment line 522 already aligned with the left edge 524. After the line 522 is aligned with the left edge 524 of the anvil 118, the user may select either the "Select Right Side of Anvil" button 508 or the right arrow button to advance to the next step. Alternatively, the display device 148 may be configured to advance automatically once the line 522 is set.

Figure 6:
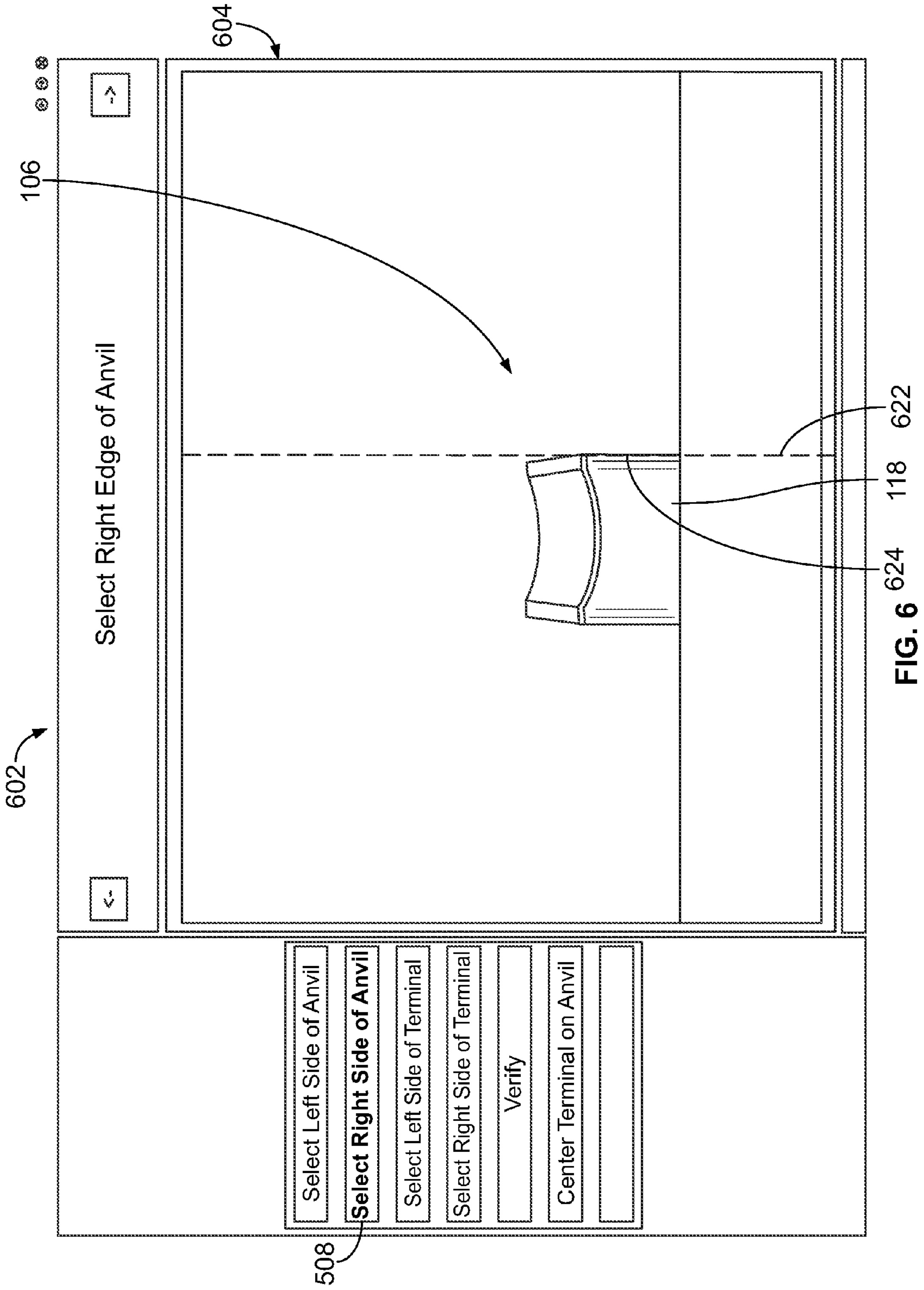
FIG. 6 shows a second screen shot displayed on the monitor.

FIG. 6 shows a screen shot 602 which may be subsequent to screen shot 502 in the process for aligning terminals 110 (shown in FIG. 2) within the terminal crimping machine 100 (shown in FIG. 1). The screen shot 602 includes an image 604 depicting the anvil 118 in the crimping zone 106. In an exemplary embodiment, image 604 is the same image as image 504. In screen shot 602, the "Select Right Side of Anvil" button 508 is highlighted, and an alignment line 622 is displayed on the image 604. Optionally, the alignment line 622 may have a similar appearance as the alignment line 522 in FIG. 5. The alignment line 622 is manipulated to line up with a right edge 624 of the anvil 118. Alternatively, the screen shot 602 may be prior to the screen shot 502, so the right edge 624 of the anvil 118 is aligned prior to the left edge 524 (shown in FIG. 5). The displayed screen shot 602 shows the alignment line 622 aligned with the right edge 624. Although the shown screen shot 602 only includes alignment line 622, alternatively, alignment line 522 may be displayed simultaneously on the image 604. Therefore, a single screen shot may optionally show both the left alignment line 522 and the right alignment line 622.

Once both the left alignment line 522 (shown in FIG. 5) and the opposite right alignment line 622 are selected by the user, the alignment module 426 (shown in FIG. 4) is configured to calculate the location of a centerline 906 (shown in FIG. 9) of the anvil 118. The centerline 906 may be calculated by determining the horizontal midpoint between lines 522 and 622. The locations of the lines 522, 622 and centerline 906 may be stored in the memory 410 (shown in FIG. 4) of the display device 148 (shown in FIG. 4). In a more automated alternative embodiment, the left edge 524 (shown in FIG. 5) and the right edge 624 of the anvil 118 may be identified and the centerline 906 calculated automatically by the alignment module 426 using image analysis techniques as known in the field. Using image analysis would obviate the need for a user to manually select the position of the alignment lines 522 and 622.

Figure 7:
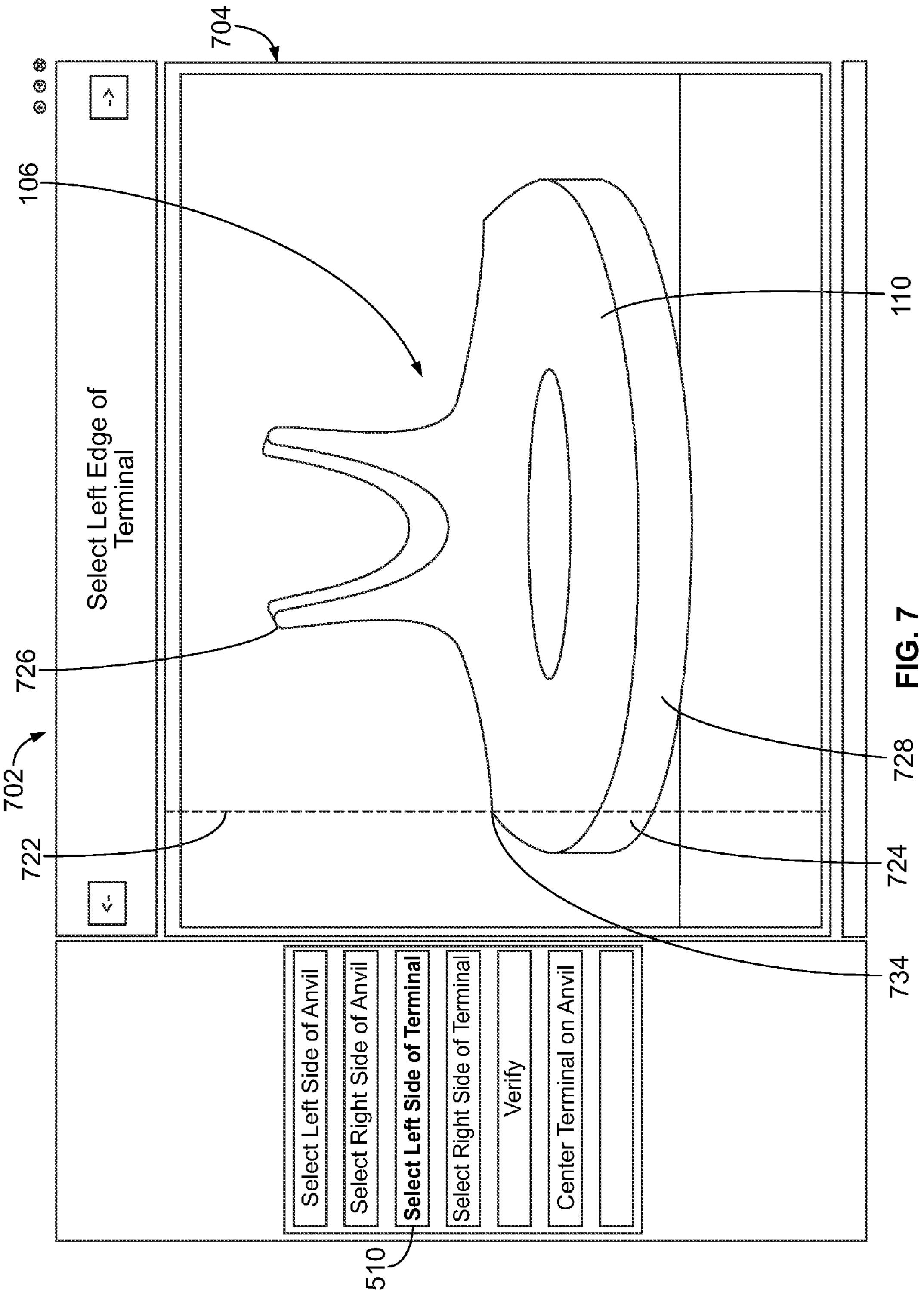
FIG. 7 shows a third screen shot displayed on the monitor.

FIG. 7 shows a screen shot 702 that includes an image 704 depicting the terminal 110 in the crimping zone 106 that was acquired by the image acquisition device 124 (shown in FIG. 2). The image 704 may be a second image that is acquired by the image acquisition device 124 subsequent to the first image 504 (shown in FIG. 5). In an exemplary embodiment, the alignment lines 522 (shown in FIG. 5) and 622 (shown in FIG. 6) of the anvil 118 (shown in FIGS. 5 and 6) are not superimposed on the image 704. The terminal 110 is positioned on the anvil 118, but the anvil 118 may not be visible underneath the terminal 110. In an exemplary embodiment, after the alignment lines 522 and 622 of the anvil 118 have been set, the terminal 110 is loaded into the crimping zone 106 by the feeder device 104 (shown in FIG. 2) or alternatively manually by the operator. In screen shot 702, the "Select Left Side of Terminal" button 510 is highlighted, and an alignment line 722 is displayed on the image 704. The alignment line 722 optionally may be distinguishable in appearance from the alignment lines 522 and 622 to represent that the line 722 is associated with the terminal 110 and not the anvil 118. For example, the line 722 may be a dotted line, a solid line, or a dashed line having a different dash pattern than the lines 522 and 622. In addition, the line 722 may have a different color than lines 522 and 622.

In an exemplary embodiment, the alignment line 722 is manipulated to line up with a left edge 724 of the terminal 110. Since the terminal 110 may have multiple components including a ferrule or barrel 726 at one end and a ring or fork 728 at the other end, the left edge 724 may be a left edge of the barrel 726 or a left edge of the ring/fork 728, as long as the corresponding alignment line is aligned with an opposite edge of the same component. In the shown screen shot 702, the alignment line 722 is aligned with the left edge 724 of the ring 728. More specifically, the line 722 is shown aligned with a rear corner 734 of the left edge 724. The alignment line 722 may be positioned by the user using the same or a similar device as was used to position alignment lines 522 and 622, such as the keyboard/mouse 414, touch screen 412, or external device 416 (all shown in FIG. 4).

Figure 8:
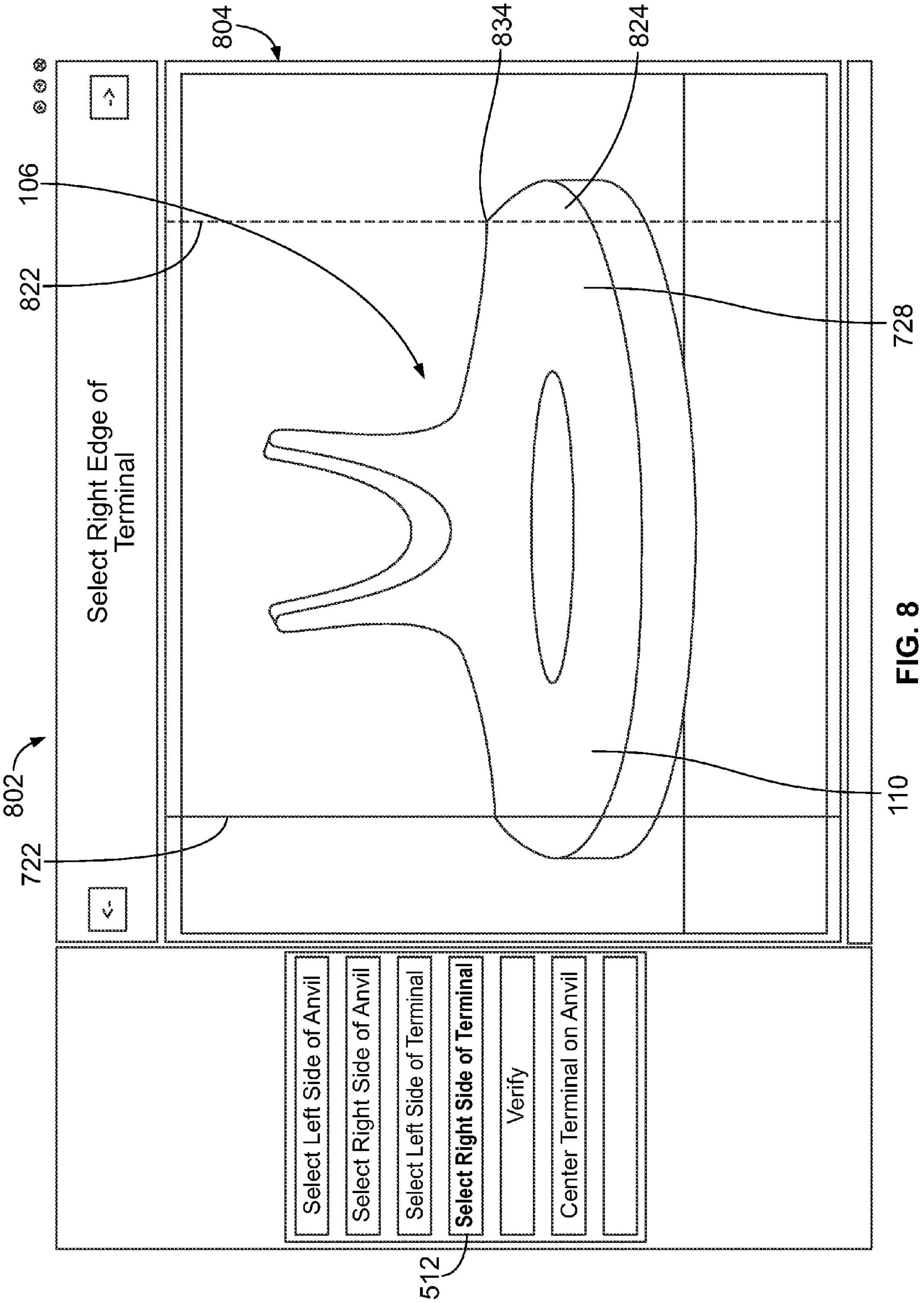
FIG. 8 shows a fourth screen shot displayed on the monitor.

FIG. 8 shows a screen shot 802 that includes an image 804 depicting the terminal 110 in the crimping zone 106. In an exemplary embodiment, image 804 is the same image as image 704, so the same terminal 110 is shown. In screen shot 802, the "Select Right Side of Terminal" button 512 is highlighted, and an alignment line 822 is displayed on the image 804. The alignment line 822 is manipulated to align with a right edge 824 of the ring 728 to mirror the alignment line 722 that was aligned with the left edge 724 of the ring 728 in screen shot 702 (shown in FIG. 7). The line 822 is shown aligned with a rear corner 834 of the right edge 824, which is opposite to the left rear corner 734. Optionally, the previously-aligned alignment line 722 may be displayed in addition to alignment line 822 to allow the user to visually compare the positions of both lines 722 and 822 to support selecting a position of line 822 that mirrors the position of line 722. Once both the left alignment line 722 and the opposite right alignment line 822 are selected/positioned by the user, the alignment module 426 (shown in FIG. 4) is configured to calculate the location of a centerline 908 (shown in FIG. 9) of the terminal 110. The centerline 908 may be calculated by determining the horizontal midpoint between lines 722 and 822. The locations of the lines 722, 822 and centerline 908 may be stored in the memory 410 (shown in FIG. 4) of the display device 148 (shown in FIG. 4).

Figure 9:
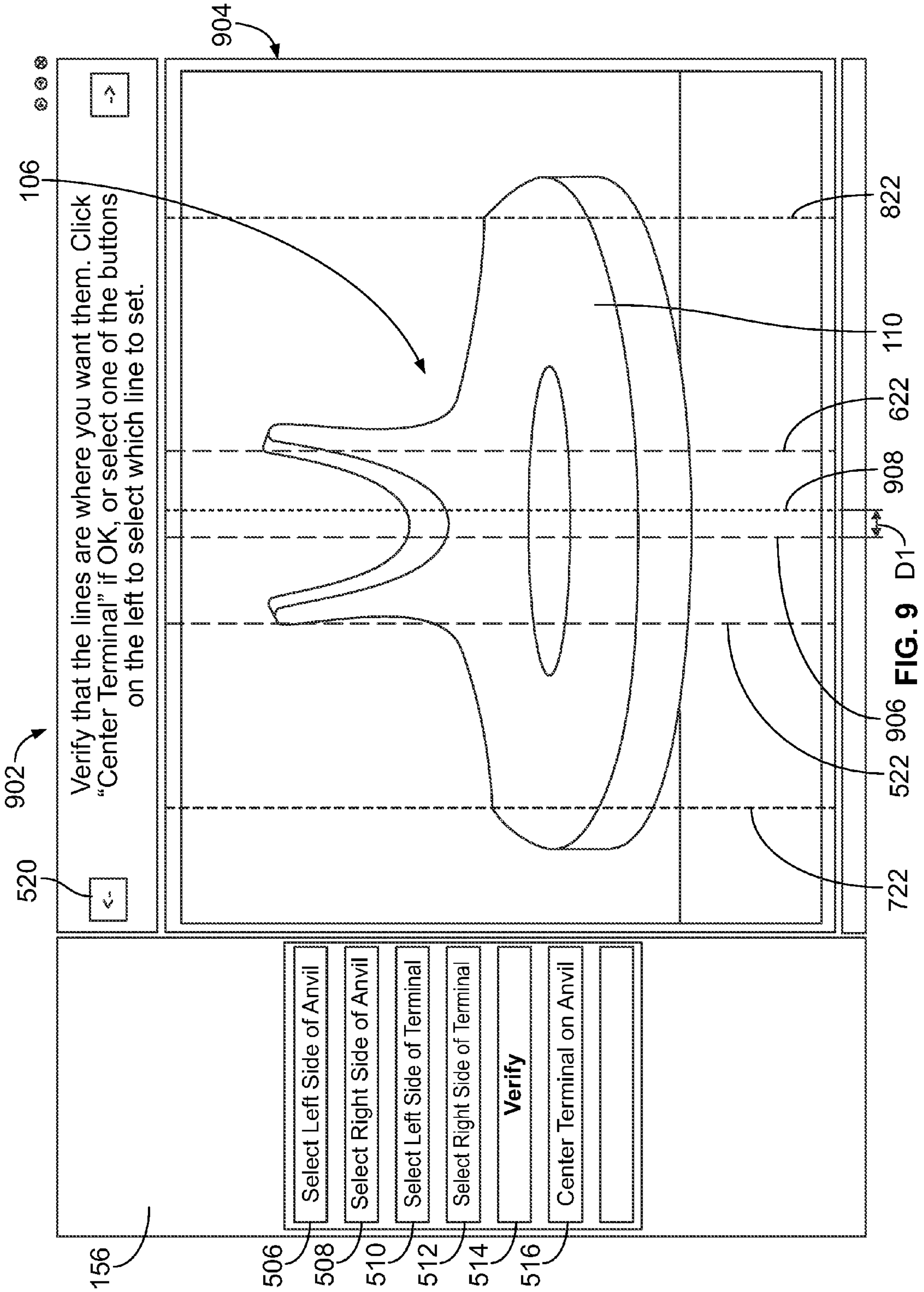
FIG. 9 shows a fifth screen shot displayed on the monitor.

FIG. 9 shows a screen shot 902 that includes an image 904 depicting the terminal 110 in the crimping zone 106. In an exemplary embodiment, image 904 is the same image as images 704 and 804 (shown in FIGS. 7 and 8, respectively). The alignment module 426 (shown in FIG. 4) is configured to superimpose at least one alignment line of the anvil 118 (shown in FIGS. 5 and 6) and at least one alignment line of the terminal 110 on the image 904. For example, the calculated centerline 906 of the anvil 118 may be displayed along with the calculated centerline 908 of the terminal 110. In the shown screen shot 902, the centerlines 906, 908 and all four of the edge lines 522, 622, 722, 822 are displayed on the image 904.

In an exemplary embodiment, the centerline 906 of the anvil 118 has an appearance, such as a dash pattern, a line thickness, or a color, that associates it with the edge lines 522 and 622 of the anvil 118. For example, as shown in screen shot 902, the centerline 906 has a like dash pattern as lines 522 and 622. Likewise, the centerline 908 of the terminal 110 has an appearance that associates it with the edge lines 722 and 822, while distinguishing it from the lines associated with the anvil 118. For example, as shown in screen shot 902, the centerline 908 has a like dash pattern as lines 722 and 822. Optionally, although not shown, the centerline 906 of the anvil 118 may have a slightly different appearance than the edge lines 522 and 622, such as a different color, to indicate that the centerline 906 was calculated and not user-selected. For example, the edge lines 522 and 622 may be red, while the centerline 906 displayed as green. The centerline 908 of the terminal 110 may be differentiated from the edge lines 722 and 822 in a similar way.

In screen shot 902, the "Verify" button 514 is highlighted. The operator or user may verify whether the alignment lines 722, 822 of the terminal 110 and/or the alignment lines 522, 622 of the anvil 118 (shown in FIGS. 5 and 6) are where the operator wants them. If not, the operator may select a button on the user interface 156 to return to a previous alignment step to re-align one or more of the alignment lines. For example, the operator may select the left arrow button 520 to go back one step or select either of the buttons 506, 508, 510, or 512 to skip to a specific previous step. As shown in image 904, the centerline 908 of the terminal 110 is not aligned with the centerline 906 of the anvil 118 although the edge lines 522, 622, 722, and 822 have been accurately set (i.e. accurately aligned with the edges of the anvil 118 and terminal 110). More specifically, the centerline 908 is separated from the centerline 906 by a distance D1. Since the centerlines 906, 908 are not aligned with each other, the terminal 110 is not properly aligned relative to the anvil 118. To determine where to re-position the terminal 110, the operator may select the "Center Terminal on Anvil" button 516.

Figure 10:
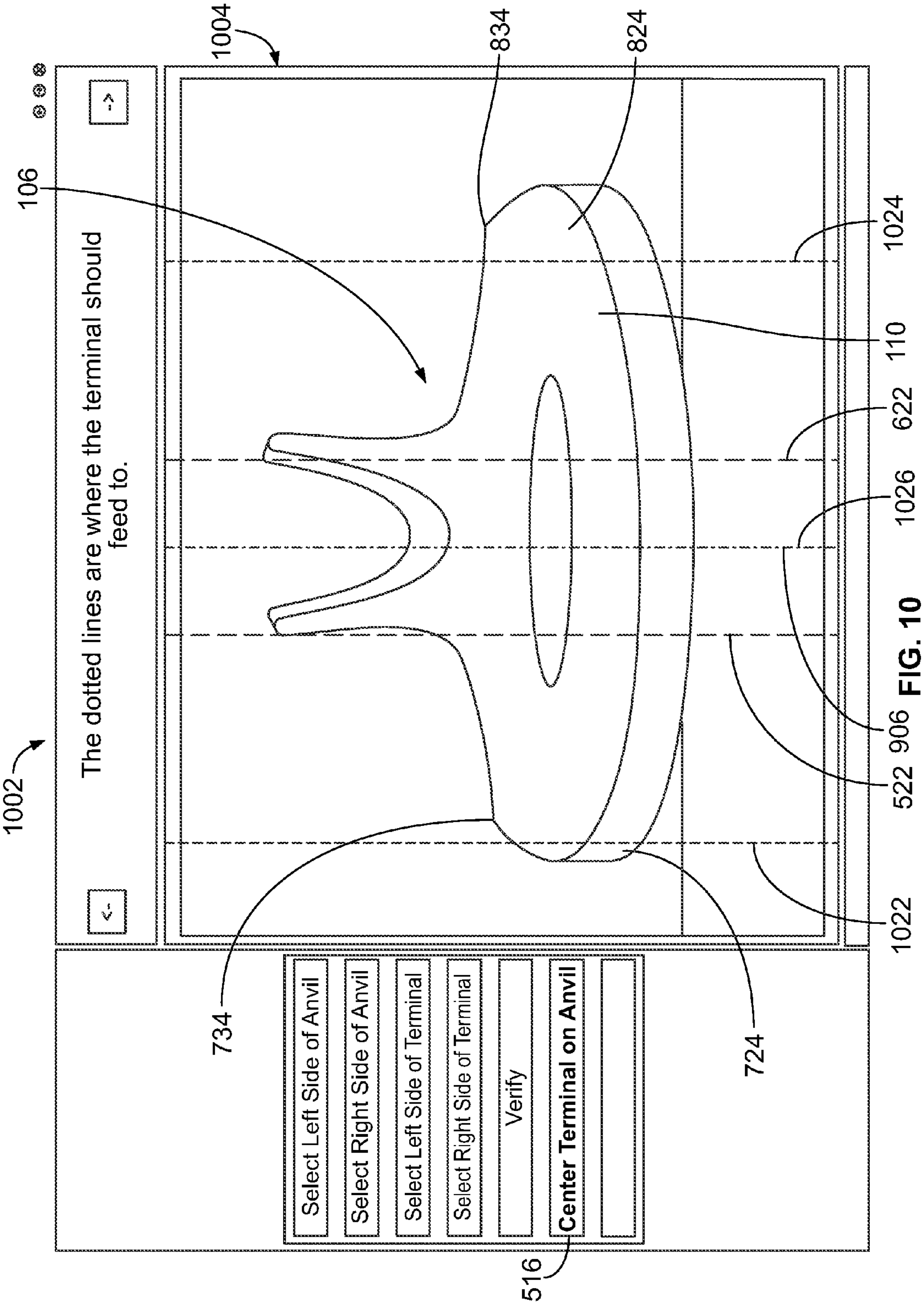
FIG. 10 shows a sixth screen shot displayed on the monitor.

FIG. 10 shows a screen shot 1002 that includes an image 1004 depicting the terminal 110 in the crimping zone 106. In an exemplary embodiment, the image 1004 is the same image as image 904. The "Center Terminal on Anvil" button 516 is highlighted, which indicates that the alignment module 426 (shown in FIG. 4) has shifted one or more alignment lines of the terminal 110 to align with one or more alignment lines of the anvil 118 (shown in FIGS. 5 and 6). More specifically, the alignment module 426 has reduced the distance D1 between calculated centerlines 906 and 908 to zero (or a negligible distance) by shifting the edge lines 722 and 822 of the terminal 110 to the left by the same distance D1. As shown in screen shot 1002, alignment line 1022 is the former line 722 shifted distance D1 to the left, alignment line 1024 is the former line 822 shifted distance D1 to the left, and centerline 1026 is the calculated midpoint between lines 1022 and 1024. Although some superimposed alignment lines have shifted, neither the image 1004 nor the actual terminal 110 in the crimping zone 106 has been modified since the terminal 110 has been loaded into the crimping zone 106, which was first shown in image 704 in FIG. 7. In addition, the alignment lines 522 and 622 of the anvil 118 and the calculated centerline 906 of the anvil 118 have also remained constant. Optionally, lines 522 and 622 need not be displayed by the alignment module 426 in screen shots 902 (shown in FIG. 9) and 1002.

The shifted alignment lines 1022 and 1024 in screen shot 1002 show where the terminal 110 should be repositioned in order to properly align with the anvil 118 (shown in FIGS. 5 and 6). For example, as shown in screen shot 1002, the alignment line 1022 no longer aligns with the rear corner 734 of the left edge 724 of the terminal, and line 1024 no longer aligns with the rear corner 834 of the right edge 824. Therefore, the terminal 110 must be aligned with the anvil 118 by adjusting the position of the terminal 110 to align with the shifted alignment lines 1022 and 1024. Since the shifted alignment lines 1022 and 1024 have a centerline 1026 that is already aligned with the centerline 906 of the anvil 118, repositioning the terminal 110 to align with the shifted lines 1022 and 1024 will align the terminal 110 with the anvil 118. In the shown screen shot 1002, the terminal 110 must be moved the distance D1 (shown in FIG. 9) to the left in the image to realign the terminal 110 with the lines 1022 and 1024. It should be noted that image distance D1 need not be the actual distance required to move the terminal 110 in the crimping zone 106. For example, the actual distance may be less if the image 1004 has been magnified on the monitor 152 (shown in FIG. 2).

The terminal 110 may be repositioned by making a terminal feed adjustment in the feeder device 104 (shown in FIG. 2) to alter the feed position of the terminals 110. The feeder device 104 is adjusted such that the device 104 feeds each terminal 110 to a feed position that is centered relative to the anvil 118 (shown in FIGS. 5 and 6). Therefore, the calculated centerline 908 of each fed terminal 110 aligns with the calculated centerline 906 of the anvil 118 without having to manually reposition each terminal 110 in the terminal strip 202 (shown in FIG. 2).

Optionally, the field of view of the image acquisition device 124 may be calibrated. The field of view may be calibrated by first entering a measured dimension of a component in the field of view into the alignment module 426 (shown in FIG. 4). For example, an operator may input a known width of the anvil 118 (shown in FIGS. 5 and 6) into the display device 148 (shown in FIG. 4). By comparing the known width of the anvil 118 with the width of the anvil 118 in an image acquired by the image acquisition device 124 (e.g., image 504 shown in FIG. 5), a calibration variable may be derived. Thereafter, distances in the images displayed on the display device 148 may be multiplied by the calibration variable to determine actual quantified distances. For example, as stated above, the terminal 110 in image 1004 must be moved a distance D1 (shown in FIG. 9) in the image 1004 to align with the anvil 118, although in actuality the terminal 110 may be adjusted a distance that is more or less than image distance D1. Once calibrated, the alignment module 426 may determine a quantified value representing an actual distance the terminal 110 must be adjusted and communicate the information to the operator for manual adjustment or to the feeder device 104 for automatic adjustment. For example, manual adjustment may be used if the applicator 102 has a graduated adjuster for terminal 110 positioning.

According to an embodiment, in a crimping machine 100 (shown in FIG. 1) with a motorized terminal feeder device 104 (shown in FIG. 1), alignment of the terminal 110 may be automatic by machine control. For example, once the operator loads the terminal strip 202 (shown in FIG. 2) and attaches the image acquisition device 124 (shown in FIG. 2), the alignment module 426 (shown in FIG. 4) may use image analysis to determine how the terminal 110 is aligned relative to the anvil 118 (shown in FIG. 2). Then, as long as the machine 100 is calibrated, the alignment module 426 may automatically make terminal feed adjustments using the feeder device 104.

Once adjustments have been made, the image acquisition device 124 (shown in FIG. 2) may be configured to acquire a new image (not shown) of the adjusted terminal 110. The new image may be displayed on the monitor 152 (shown in FIG. 2) by the display device 148 (shown in FIG. 2). The alignment module 426 (shown in FIG. 4) may superimpose the shifted alignment lines 1022 and 1024 on the new image so an operator may visually determine whether the adjustment has successfully aligned the terminal 110 with the anvil 118 (shown in FIGS. 5 and 6). Once the terminal 110 is properly aligned, the movable ram 144 (shown in FIG. 2) may be actuated to move along the crimp stroke such that the crimp tooling 108 (shown in FIG. 2) crimps the aligned terminal 110 to the wire 112 (shown in FIG. 1). After crimping, a new terminal 110 is fed to the crimping zone 106, and a new image or video is acquired by the image acquisition device 124.

Optionally, for subsequent terminals 110 in the terminal strip 202 (shown in FIG. 2), the edge lines 522 and 622 of the anvil 118 (shown in FIGS. 5 and 6) need not be re-selected if neither the anvil 118 nor the image acquisition device 124 (shown in FIG. 2) has been moved, since the edges 522, 622 and calculated centerline 906 will remain constant. Therefore, the first steps for subsequent terminals 110 may be to skip ahead to selecting the left and right edges of each terminal 110, as shown in FIGS. 7 and 8. Furthermore, even these steps may be omitted if the terminals 110 in the terminal strip are uniform in size and shape. For example, once the first terminal 110 is properly aligned, the alignment lines 1022 and 1024 are determined to be at the edges of a properly aligned terminal 110. The location of the alignment lines 1022 and 1024 may be stored in the memory 410 (shown in FIG. 4). Thereafter, images of subsequent terminals 110 in the crimping zone 106 may be superimposed with the alignment lines 1022 and 1024 by the alignment module 426 (shown in FIG. 4), similar to screen shot 1002 in FIG. 10, to show how each terminal 110 is located relative to where the edges 734, 834 of the terminal 110 should be located to be properly aligned. In an alternative embodiment, once a terminal 110 is properly aligned, instead of storing only edge lines 1022 and 1024, additional lines may also be stored, such as barrel edge lines, horizontal top and bottom edge lines, front and back edge lines, and even a complete outline of the aligned terminal 110, which would allow an operator to more easily visually compare subsequent terminals 110 to a properly aligned terminal 110.

Figure 11:
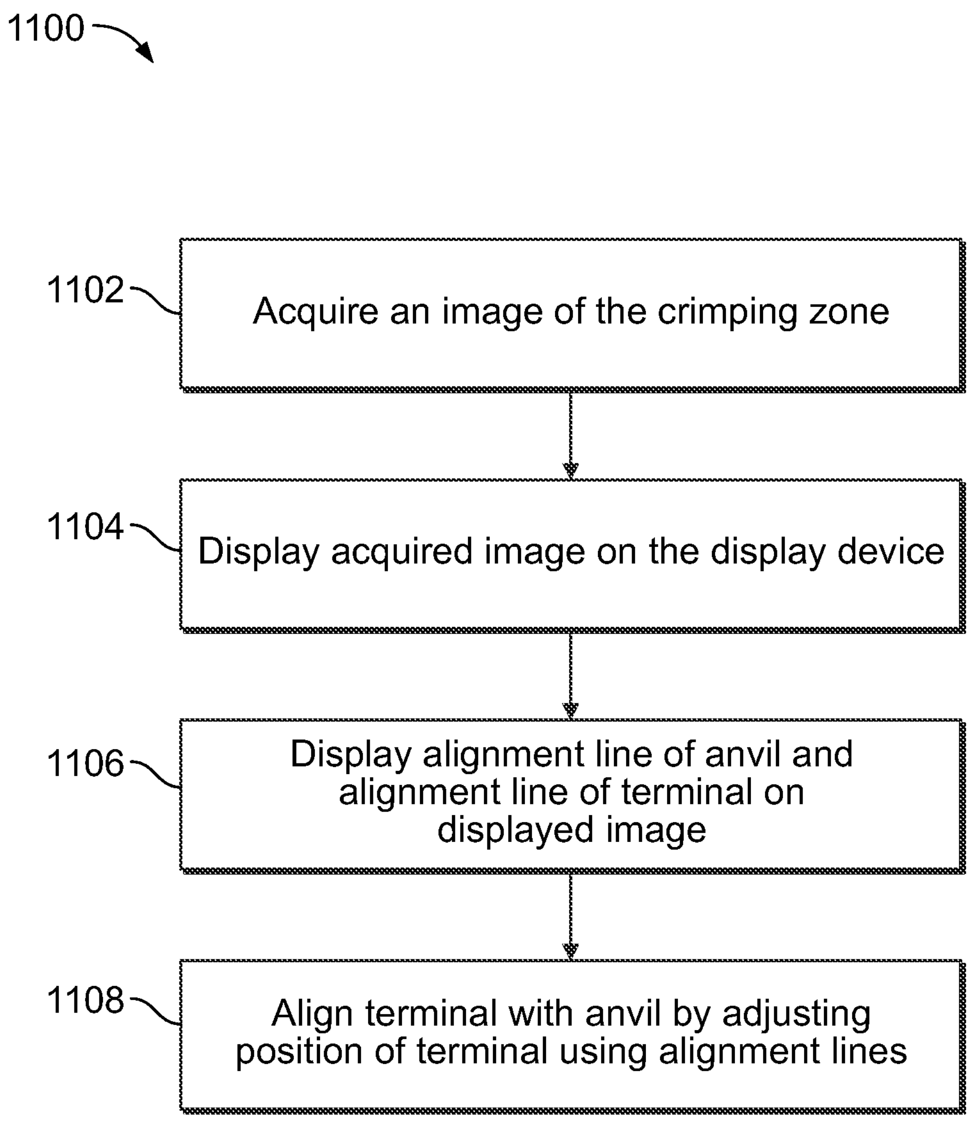
FIG. 11 is a flow diagram of a method of aligning a terminal within a terminal crimping machine.

FIG. 11 is a flow diagram of a method 1100 of aligning a terminal within a terminal crimping machine. The terminal crimping machine may be terminal crimping machine 100 shown in FIG. 1. The method 1100 may be performed using the components of the crimping machine 100 shown in FIG. 2. At 1102, the image acquisition device 124 is positioned to acquire at least one image of the crimping zone 106. The image includes the terminal 110 and/or the anvil 118. In an exemplary embodiment, the image acquisition device 124 is positioned in line with the longitudinal axis 128 of the anvil 118. At 1104, the acquired image or images are displayed on the display device 148. The image acquisition device 124 has a macro capability, and the at least one acquired image is magnified when displayed on the display device 148.

At 1106, an alignment line of the anvil 118 and an alignment line of the terminal 110 are superimposed on one displayed image. In an exemplary embodiment, the alignment line of the anvil 118 is a centerline of the anvil 118, and the alignment line of the terminal 110 is a centerline of the terminal 118. The centerline of the anvil 118 may be calculated based on user-selected first and opposite second edges of the anvil 118 in the at least one displayed image. The centerline of the terminal 110 may be calculated based on user-selected first and opposite second edges of the terminal 110 in the at least one displayed image. Alternatively, the centerline of the anvil 118 and/or terminal 110 may be calculated automatically using an image analysis. For example, the alignment module 426 (shown in FIG. 4) may electronically identify the first and opposite second edges of the respective anvil 118 and/or terminal 110 in the image.

At 1108, the terminal 110 is aligned with the anvil 118 by adjusting the position of the terminal 110 to align the alignment line of the terminal 110 with the alignment line of the anvil 118. The method may further include calibrating a field of view of the image acquisition device 124. The field of view may be calibrated by entering a measured dimension into the alignment module 426 (shown in FIG. 4). After calibrating, the difference in position between the alignment line of the anvil 118 and the alignment line of the terminal 110 in the displayed image may be represented by a quantified value. The feed position of the feeder device 104 may be automatically adjusted based on the quantified value. After the terminal 110 is aligned with the anvil 118 at step 1108, the method 1100 optionally may include actuating the movable ram 144 to move along the crimp stroke such that the crimp tooling 108 crimps the aligned terminal 110 to the wire 112.

In an exemplary embodiment, the image acquisition device 124 acquires a first image of the anvil 118 in the crimping zone 106. The first image is displayed on the display device 148. A first and an opposite second edge of the anvil 118 in the displayed first image are selected. A centerline of the anvil 118 may be calculated based on the selected first and second edges, and the centerline may be shown on the first image. Next, a terminal 110 may be loaded onto the anvil 118 in the crimping zone 106. A second image of the crimping zone 106, including the terminal 110 therein, is then acquired using the image acquisition device 124. The second image is then displayed on the display device 148. Like the anvil 118 previously, first and opposite second edges of the terminal 110 may be selected in the displayed second image. The centerline of the terminal 110 may be calculated based on the selected first and second edges, and both the centerline of the anvil 118 and the centerline of the terminal 110 are shown on the second image. Alternatively, both centerlines may be shown on a third image. Next, the location of the centerline of the anvil 118 is compared to the location of the centerline of the terminal 110. The position of the terminal 110 in the crimping zone 106 is adjusted, if necessary, to align the centerline of the anvil 118 with the centerline of the terminal 110. Optionally, the centerline of the terminal 110 may be re-calculated after adjusting the position of the terminal 110, and the new centerline shown on a third image with the centerline of the anvil 118 to determine whether the terminal 110 is now properly aligned with the anvil 118 or if further adjustment is necessary.

Figure 12:
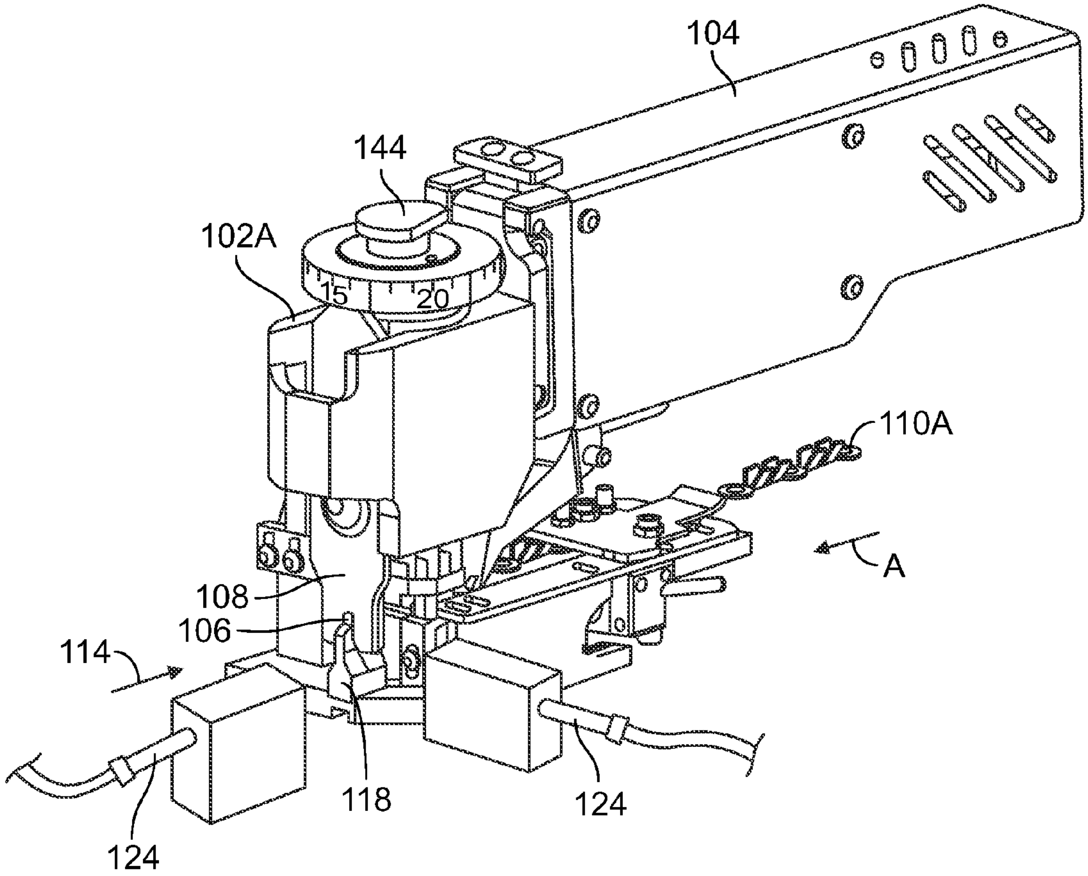
FIG. 12 is a perspective view of an end-feed type applicator and a feeder device according to an alternate embodiment.

FIG. 12 is a perspective view of an end-feed type applicator 102A and the feeder device 104. The applicator 102A may be similar to the applicator 102 shown in FIG. 2. As such, like reference numerals are used to identify like features. The feeder device 104 is positioned adjacent to the applicator 102A and presents end-feed terminals 110A to the crimping zone 106 of the applicator 102A. The end-feed terminals 110A are stacked end-to-end and fed in a feed direction A to a feed position within the crimping zone 106. The wire 112 (shown in FIG. 1) may be fed to the crimping zone 106 in the feed direction 114, which is generally opposite to the feed direction A of the terminals 110A. Besides the feed direction of the terminals 110A, the crimping operation is the generally the same, and includes a movable ram 144 coupled to crimp tooling 108 which drops and engages a stationary anvil 118 to crimp a barrel of the terminal 110A to the wire 112.

With an end-feed applicator 102A, the forward stroke of the feed mechanism is adjustable. The front-to-back feed position of the terminals 110A, as well as the side-to-side position, must be correctly adjusted for proper alignment of the terminal 110A to produce a lead that meets the crimp specification. Therefore, an image acquisition device 124A may be positioned perpendicular to the feed direction A of the terminals 110A to acquire images and/or video showing the front-to-back position of the terminal 110A in the crimping zone 106 relative to the anvil 118 or another stationary component of the applicator 102A. The image acquisition device 124A may also be positioned perpendicular to a longitudinal axis (not shown) of the anvil 118 and/or to an axis (not shown) defined by the length of each terminal 100A. A second image acquisition device 124B may be positioned in-line with the longitudinal axis of the anvil 118 in order to show the side-to-side position of the terminal 110A in the crimping zone 106, as described above with image acquisition device 124. Optionally, the acquisition device 124B may be located on the wire-feed side of the applicator 102A, especially if there is limited space on the other side due to the feeder device 104 and end-feed terminal strip. Attaching two image acquisition devices at perpendicular positions allows an operator to align the terminal in the crimping zone along multiple planes, including front-to-back and side-to-side.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A terminal crimping machine comprising:
- an applicator including a movable ram and an anvil, the anvil located in a crimping zone and configured to receive a terminal thereon, the ram having crimp tooling configured to crimp the terminal on the anvil to a wire during a crimp stroke of the ram;
- an image acquisition device positioned to acquire at least one image of the crimping zone;
- a display device configured to display the at least one acquired image;
- an alignment module superimposing an alignment line of the anvil and an alignment line of the terminal on a displayed image on the display device, wherein the alignment line of the anvil and the alignment line of the terminal are respective centerlines of the anvil and the terminal, the alignment module further configured to superimpose a left edge alignment line and a right edge alignment line on an image of the terminal displayed on the display device, locations of the left and right edge alignment lines determined based on a distance between the respective centerlines of the anvil and the terminal, the left and right edge alignment lines indicating desired positions of a left edge and a right edge, respectively, of the terminal to align the terminal with the anvil; and
- a feeder device configured to feed the terminal to a feed position on the anvil within the crimping zone for crimping to the wire, the feeder device configured to adjust the feed position of the terminal relative to the anvil based on relative locations of the respective alignment lines of the anvil and the terminal on the displayed image in order to align the terminal with the anvil.

2. The terminal crimping machine of claim 1, wherein the alignment line of the anvil comprises a centerline of the anvil, the centerline of the anvil calculated based on user-selected first and opposite second edges of the anvil in a first displayed image on the display device, and wherein the alignment line of the terminal comprises a centerline of the terminal, the centerline of the terminal calculated based on user-selected first and opposite second edges of the terminal in a second displayed image.

3. The terminal crimping machine of claim 1, wherein the alignment line of the anvil comprises a centerline of the anvil, the centerline of the anvil calculated automatically using image analysis of the anvil in a displayed image, and wherein the alignment line of the terminal comprises a centerline of the terminal, the centerline of the terminal calculated automatically using image analysis of the anvil in a displayed image.

4. The terminal crimping machine of claim 1, wherein the image acquisition device acquires a first image of the anvil without the terminal thereon, and the image acquisition device acquires a second image of the anvil with the terminal thereon.

5. The terminal crimping machine of claim 4, wherein the alignment module determines the location of the alignment line of the anvil based on the first image, the alignment module determines the location of the alignment line of the terminal based on the second image, and the alignment module superimposes both of the alignment lines on the displayed second image.

6. The terminal crimping machine of claim 1, wherein a field of view of the image acquisition device is calibrated, and a distance between the relative locations of the alignment line of the anvil and the alignment line of the terminal in the displayed image is represented by a quantified value.

7. The terminal crimping machine of claim 6, wherein the feeder device is configured to automatically adjust the feed position of the feeder device based on the quantified value to change the position of the terminal relative to the anvil within the crimping zone for crimping to the wire.

8. The terminal crimping machine of claim 1, wherein the feed position of the terminal is adjusted based on the acquired image.

9. The terminal crimping machine of claim 1, wherein the image acquisition device has a macro capability, and the at least one acquired image is magnified when displayed on the display device.

10. The terminal crimping machine of claim 1, wherein the image acquisition device includes a mounting fixture that is magnetically attached to the applicator.

11. The terminal crimping machine of claim 1, wherein the image acquisition device is positioned in line with a longitudinal axis of the anvil.

12. The terminal crimping machine of claim 1, wherein the display device includes a user interface configured to receive user inputs selecting edges of at least one of the anvil and terminal, the positions of the selected edges being used by the alignment module to calculate the alignment line of at least one of the anvil and the terminal.

13. A terminal crimping machine comprising:
- an applicator including a movable ram and an anvil, the anvil located in a crimping zone and configured to receive a terminal thereon, the ram having crimp tooling configured to crimp the terminal on the anvil to a wire during a crimp stroke of the ram;
- an image acquisition device positioned to acquire at least one image of the crimping zone, the image acquisition device including a mounting fixture removably mounted to the applicator, the mounting fixture keyed to the applicator in a single orientation for repeatable alignment of the image acquisition device;
- display device configured to display the at least one acquired image;
- an alignment module superimposing an alignment line of the anvil and an alignment line of the terminal on a displayed image on the display device; and
- a feeder device configured to feed the terminal to a feed position on the anvil within the crimping zone for crimping to the wire, the feeder device configured to adjust the feed position of the terminal relative to the anvil based on relative locations of the respective alignment lines of the anvil and the terminal on the displayed image in order to align the terminal with the anvil.

14. The terminal crimping machine of claim 13, wherein the alignment line of the anvil and the alignment line of the terminal are respective centerlines of the anvil and the terminal.

15. The terminal crimping machine of claim 14, wherein the alignment module is configured to superimpose a left edge alignment line and a right edge alignment line on an image of the terminal displayed on the display device, locations of the left and right edge alignment lines determined based on the distance between the respective centerlines of the anvil and the terminal, the left and right edge alignment lines indicating desired positions of the left edge and the right edge, respectively, of the terminal to align the terminal with the anvil.

16. A terminal crimping machine comprising:

an applicator including a movable ram and an anvil, the anvil located in a crimping zone and configured to receive a terminal thereon, the ram having crimp tooling configured to crimp the terminal on the anvil to a wire during a crimp stroke of the ram, the terminal having a left edge and an opposite right edge;

an image acquisition device positioned to acquire at least one image of the crimping zone;

a display device configured to display the at least one acquired image, the display device further displaying a first line associated with the left edge of the terminal and a second line associated with the right edge; and an alignment module configured to determine a centerline of the terminal based on locations of the first and second lines associated with the left and right edges of the terminal on the display device, the alignment module further configured to superimpose the centerline of the terminal and a centerline of the anvil on a displayed image, wherein the terminal is aligned with the anvil by adjusting the position of the terminal relative to the anvil based on a distance between the respective centerlines of the anvil and the terminal on the displayed image.

17. The terminal crimping machine of claim 16, wherein the image acquisition device acquires a first image of the anvil without the terminal thereon, and the image acquisition device acquires a second image of the anvil with the terminal thereon, the alignment module determining a location of the centerline of the anvil based on the first image, the alignment module determining a location of the centerline of the terminal based on the second image, the alignment module superimposing both of the centerlines on the displayed second image.

18. The terminal crimping machine of claim 16, wherein the display device includes a user interface configured to receive user inputs selecting the locations of the left and right edges of the terminal on an image of the terminal displayed on the display device, the alignment module configured to calculate the centerline of the terminal based on the user inputs.

19. The terminal crimping machine of claim 16, further comprising a feeder device configured to feed the terminal to a feed position on the anvil within the crimping zone for crimping to the wire, the feeder device configured to adjust the feed position of the terminal relative to the anvil based on the distance between the respective centerlines of the anvil and the terminal in order to align the terminal with the anvil.

20. The terminal crimping machine of claim 16, wherein the alignment module is configured to superimpose a left edge alignment line and a right edge alignment line on an image of the terminal displayed on the display device, locations of the left and right edge alignment lines determined based on the distance between the respective centerlines of the anvil and the terminal, the left and right edge alignment lines indicating desired positions of the left edge and the right edge, respectively, of the terminal to align the terminal with the anvil.

* * * * *